Figure 4:
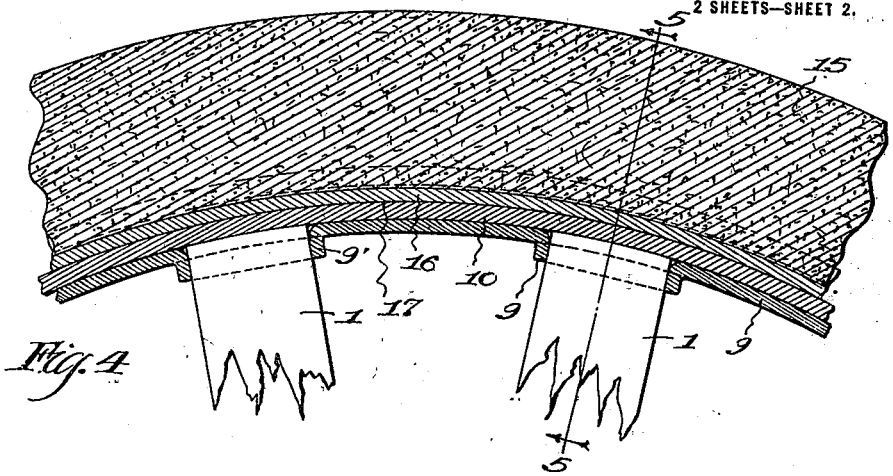

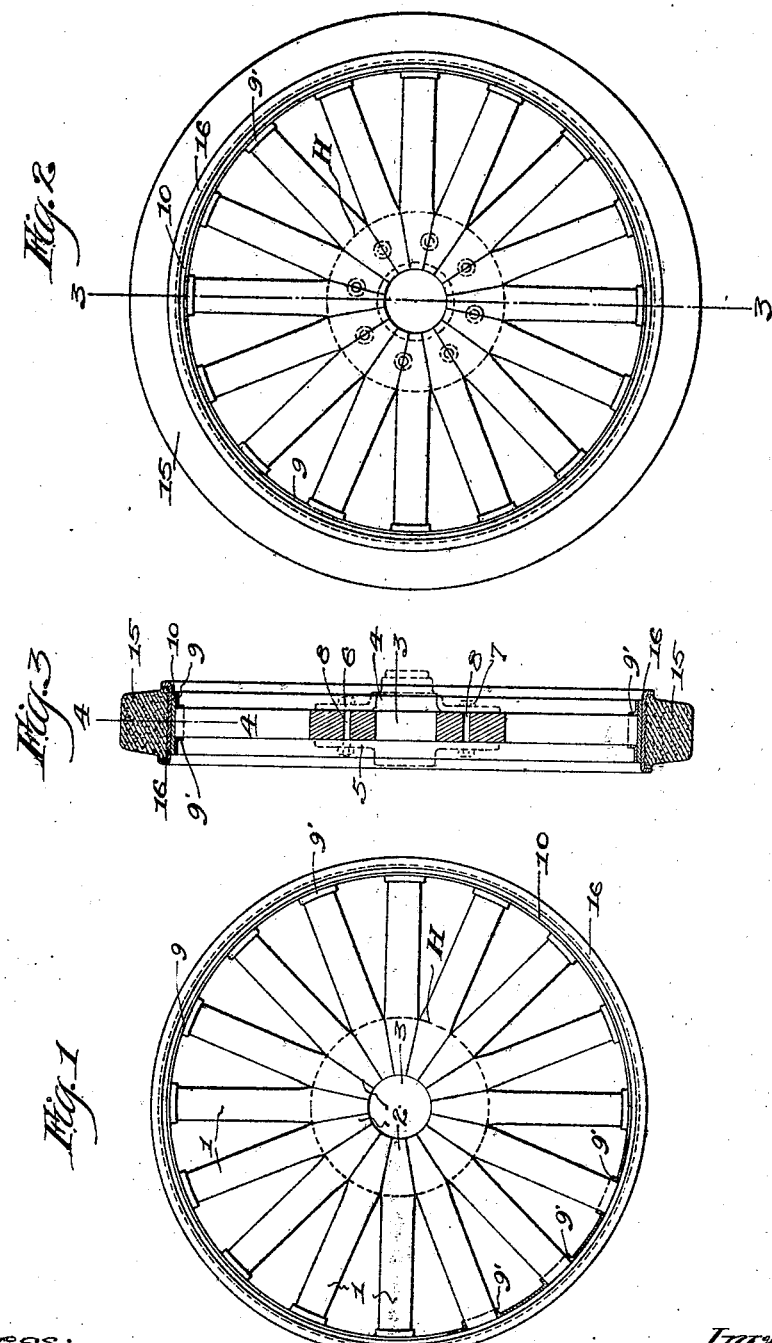

E. K. BAKER.
SEMIWOOD WHEEL FOR MOTOR TRUCKS.
APPLICATION FILED JAN. 31, 1919.

1,435,370.

Patented Nov. 14, 1922.

2 SHEETS—SHEET 2.

Witness:
Earl E. Jones

Inventor:
Eric K. Baker
by Charles Gilbert Hawley, Atty

Patented Nov. 14, 1922.

1,435,370

UNITED STATES PATENT OFFICE.

ERLE KING BAKER, OF CHICAGO, ILLINOIS, ASSIGNOR TO BAKER WHEEL & RIM COMPANY, OF CHICAGO, ILLINOIS, A CORPORATION OF ILLINOIS.

SEMIWOOD WHEEL FOR MOTOR TRUCKS.

Application filed January 31, 1919. Serial No. 274,325.

*To all whom it may concern:*

Be it known that I, ERLE K. BAKER, a citizen of the United States, and a resident of Chicago, county of Cook, and State of Illinois, have invented certain new and useful Improvements in Semiwood Wheels for Motor Trucks, of which the following is a specification.

My invention relates to improvements in automobile wheels and relates more particularly to wheels of a type adapted to the carrying of great loads such as are met with in motor truck practice. My invention is specially concerned with the production of a solid rubber tire wheel.

While wheels of both metal and wood have been used in motor-truck practice it is quite generally admitted that the wooden wheel has certain advantages that are not to be found in the all-metal wheel. One such desirable feature found in the wooden wheel is that of greater resiliency and the consequent smaller transmission of destructive forces to the axle and other parts of the vehicle. Resiliency in a motor truck wheel is particularly necessary where the wheel is provided with a hard or solid rubber tire because of the excessive vibration which such tire entails especially when the vehicle is operated at high speed.

The prevailing type of wooden wheel is composed of a plurality of wooden spokes radiating from a hub portion outwardly, the ends of the spokes being reduced and tenoned in a heavy wooden felly. The wooden felly, heretofore necessary, must be made of high-grade wood, such as is susceptible of being bent into an arc, constituting a segment of the wheel. Not only is such felly wood scarce, but it is also quite difficult to bend and shape and the operation of making the wheel, as heretofore practiced, requires a workman having a relatively high degree of skill.

In order to secure the requisite strength, for motor trucks of large capacity, the practice has developed of reducing the size of the wheel. This reduction in the size of the wheel, while providing greater rigidity necessarily has a complementary disadvantage in that it destroys, in a large measure, the highly desirable resilient features of the wooden wheel. Resiliency is further minimized in the smaller sizes of wheels by the relatively large proportion of the felly to the entire wheel.

If it be attempted to secure the requisite resiliency in the wood wheel by providing relatively long spokes, even assuming that other factors do not prohibit such a design, another difficulty is at once encountered, that is to say whereas, a short spoke composed of an ordinary grade of wood furnishes the requisite strength, a long spoke would require a very high grade of wood, so much so that it would have to be of selected stock which would add greatly to the cost of the wheel.

A detailed object of the present invention is to provide a motor-truck wheel, and a method of manufacturing the same, which shall be adapted for mounting a single solid tire as well as a so-called dual tire construction.

My invention consists generally in a motor-truck wheel, and in the method of producing the same, whereby the above named objects and purposes, together with a number of others that will appear hereinafter, are attained; and my invention will be more readily understood by reference to the drawings, wherein I have depicted what I now consider to be the preferred embodiment thereof, but which, it should be understood, is by way of illustration and not by way of limitation.

Figure 5:
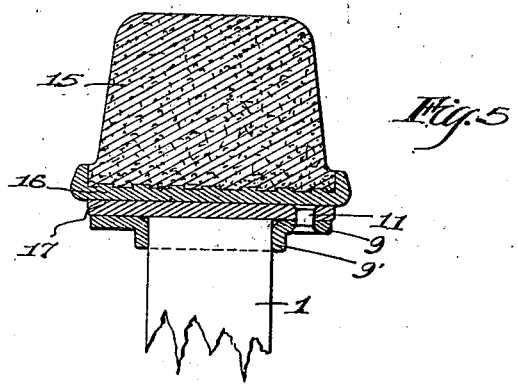
Figure 6:
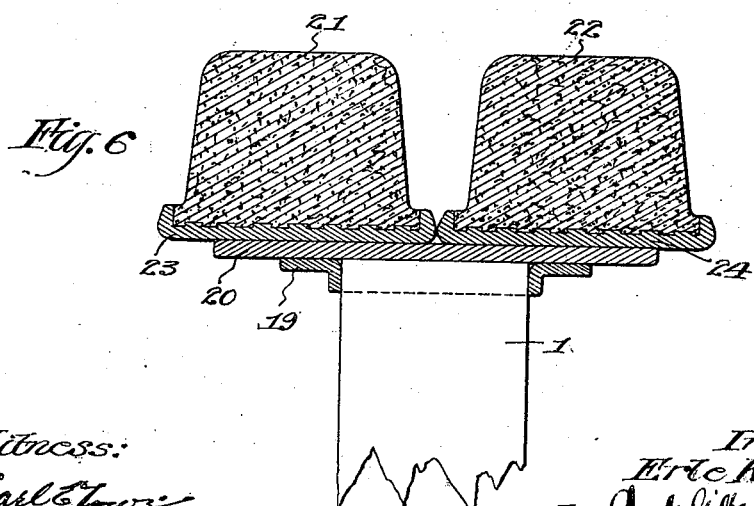

In the drawings: Figure 1 is a side elevation showing a wheel embodying my invention before the solid rubber tire is mounted thereon; Fig. 2 is a side elevation similar to Fig. 1 but showing the rubber tire in place; Fig. 3 is a section taken on the line 3—3 of Fig. 2; Fig. 4 is an enlarged fragmentary view of a portion of the wheel substantially on the line 4—4 of Fig. 3; Fig. 5 is a sectional view substantially on the line 5—5 of Fig. 4; and Fig. 6 is a transverse sectional detail view of a dual tire structure embodying my invention.

Referring to the drawings, it will observed that the body of the wheel comprises a plurality of wooden spokes, 1, having mitered ends, 2, adapted to be tightly wedged together and thereby defining the hub hole 3. To the hub of the wooden part may be secured the metallic hub, 4, of usual construction, and shown only by dotted lines in the drawing. The metallic hub, 4, is provided with a flange, 5, on one side and upon the opposite side will be found a slip-flange, 6. The metallic hub parts are rigidly secured to the hub of the wheel, i. e., that portion formed by the mitered portions, 2, of the spokes by means of suitable bolts, 7, passing through holes, 8. I have designedly provided a much larger number of spokes, 1, than is customary, for the purpose of serving a number of highly important and desirable functions. By providing a relatively large number of spokes, 1, I am enabled to provide a relatively large wooden hub portion, such as is indicated by the dotted circle in Figs. 1 and 3 to which the letter H has been applied, and since the strength of a wooden wheel is largely determined by the size of the hub-portion, I have provided a wheel of sufficient strength to be employed in even the heaviest types of truck wheels.

As will be observed, I have entirely eliminated the old form of wooden felly with its expensive, short-lived, mortise and tenoned connection with the spoke ends, and employ only a metal band, 9. As a matter of convenience, I shall term this band a spacing band. The spacing band is provided with a plurality of sockets, 9', of such a shape as tightly to fit the ends of the wooden spokes. These sockets may be formed in various ways but they are preferably formed as an integral part of the spacing band by punching or forming the metal inwardly at spaced points. A relatively long socket is thus provided and when the spoke end is forced thereinto it is firmly and securely held in place. The socket being of metal obviously expands very little so that in use a tight joint is always maintained.

Upon the spacing band, 9, I tightly mount a band or rim, 10. This rim for convenience I shall refer to as a fixed rim. The form of this band may vary but I prefer to use what is known as an S. A. E. band for solid rubber tires. This band is substantially a cylindrical band made of a size adapted to receive a standard size solid rubber tire and its containing rim.

As the form and construction of this band is well known, it is thought the above description will be sufficient.

The fixed rim, 10, may be mounted upon the spacing band in various ways. For example, it may be shrunk upon the spacing band and thereby secured with sufficient strength to form a driving connection between the fixed rim and the spacing band. If desired the parts may be additionally secured as by means of rivets one of which is indicated at 11 in Fig. 5. So also the fixed rim may be mounted by pressing the same transversely over the spacing band by heavy hydraulic pressure. In any event the fixed rim is tensioned upon the spacing band and spoke ends thereby forming a structure of great strength and durability.

The spokes as shown are substantially square in cross section, and with spokes of this kind it is but necessary to miter the ends of the various spokes, which in turn simplifies the production thereof. Such spokes can be sawed and planed from stock sized of material with standard sawing and planing machinery, and as easily mitered in like manner. The relatively slow and laborious method of turning down the outer ends of the spokes is thus eliminated.

I desire to call attention to another function served by the large number of spokes, and that is, that the fixed rim in being tensioned upon the spacing band and spokes is supported at such a large number of points that I am enabled to provide a finished wheel that is truly cylindrical and not polygonal. I am also enabled to shrink the band more firmly upon the spoke ends, without danger of distortion and thereby set the body of the wheel in such a state of compression as will successfully defy any forces tending to loosen or separate the parts in use. Obviously by dispensing with the felly, there are fewer parts in the assembled wheel and hence fewer joints that can loosen in any event, and the very parts which give the most trouble in use, to-wit, the tenoned and the mortised wooden joints, are eliminated. Again, by tightly tensioning the fixed rim upon the spoke ends, I effectually seal the ends of the spokes against the entrance of foreign matter and thereby prolong the life and the durability of the spokes.

Dispensing with the wooden felly as I do, I am enabled to provide a relatively large wooden hub portion in the wheel, such as will give the requisite strength even for motor trucks of large capacity. At the same time I provide a projecting spoke of a length sufficient to be actually resilient, even where the wheel, as a whole, is of relatively small diameter. I thus not only provide a strong, yet resilient wheel, but I also provide one in which the spoke portions projecting from the hub are not of undue length and can, therefore, be made of ordinary wood and yet be of requisite strength.

The wheel is now ready to receive the rubber tire. The rubber tire, 15, is mounted or embedded firmly in a metal rim, 16, of usual or desired construction and presents an inner cylindrical surface, 17, of a size adapted tightly to encompass the fixed rim upon which it may be mounted in various ways. One suitable way is to press the tire rim transversely over the fixed rim by means of heavy hydraulic or other pressure. When thus positioned a strong driving fit is established and the wheel as a whole is further strengthened.

As shown in Fig. 6, my wheel is also well adapted to the dual tire construction. Therein the wooden wheel body may be produced and formed in the manner already described, except that where necessary the parts may be enlarged. The fixed rim, 20, is secured upon the spacing band, 19, as before described but in this instance it is preferably somewhat wider to the end that it may form a suitable seat for the two solid tires, 21 and 22, and their rims, 23 and 24, respectively.

The simple, durable, resilient and other eminently practical and desirable features of the invention will be apparent to those skilled in the art to which it appertains without further comment.

The generic invention and a specific form and method are presented and claimed in my companion application Serial No. 271,224, filed January 15, 1919.

I claim:—

A semi-wood motor vehicle wheel, comprising a plurality of radial wooden spokes, having mutually coactive mitered butts, in combination with a spoke spacing and spoke holding metal band tightly embracing the ends of the spokes, a fixed rim firmly tensioned upon said spacing band and the ends of said wooden spokes, and sealing the end-grain of the wooden spokes, and an endless metal rim carrying a solid rubber tire and exerting compressive tension on, and throughout the circumference of, said fixed rim.

In testimony whereof, I have hereunto set my hand this 28th day of January, 1919.

ERLE KING BAKER.